Nov. 16, 1965  A. ALDROPP  3,217,914
BOOM-TYPE CAMPER COACH LOADER AND UNLOADER
Filed July 12, 1963  3 Sheets-Sheet 3
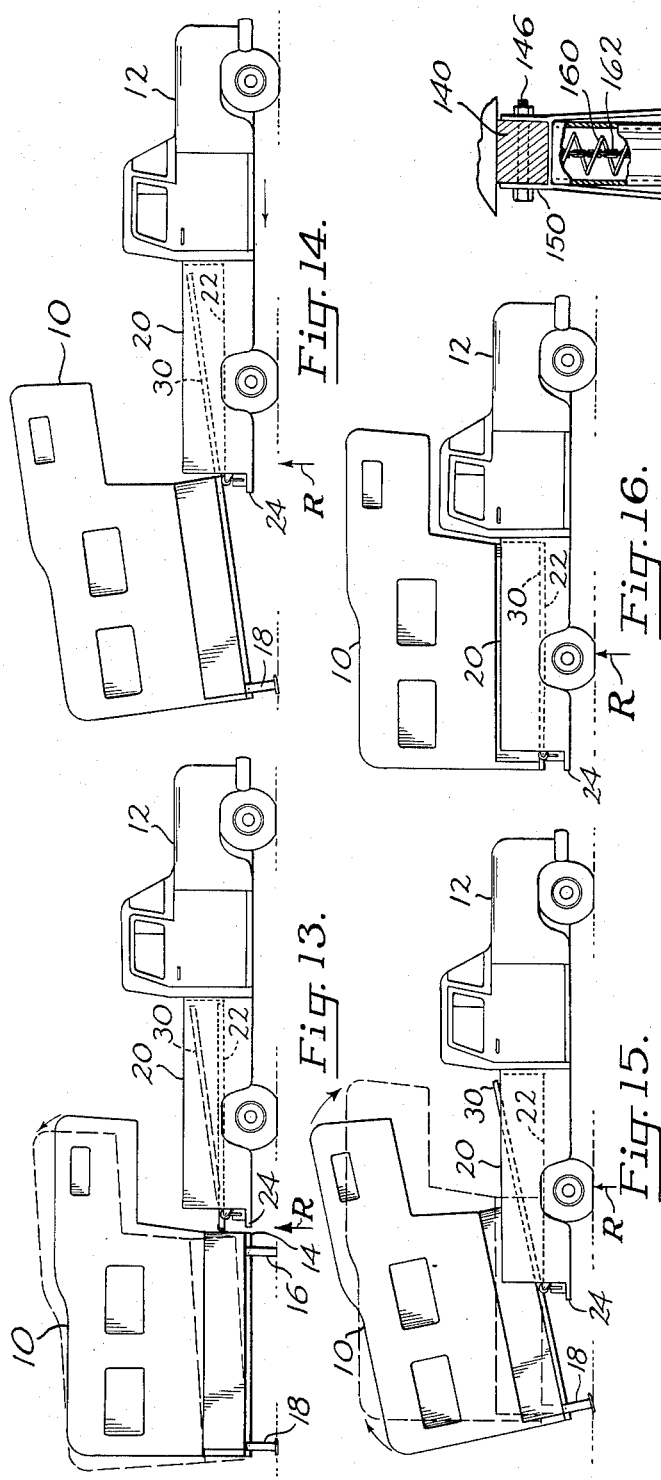
Art Aldropp
INVENTOR.
BY
Atty.

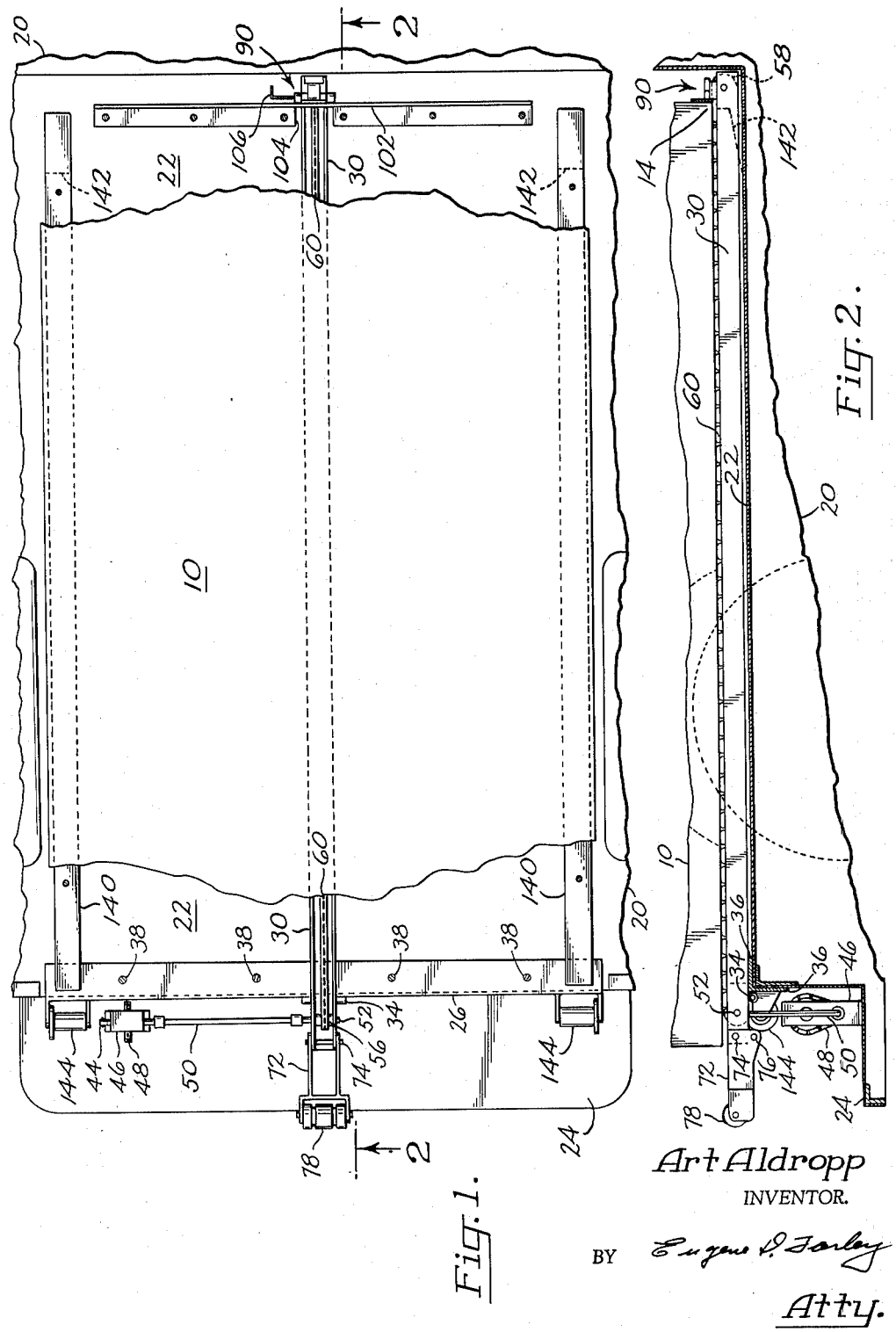

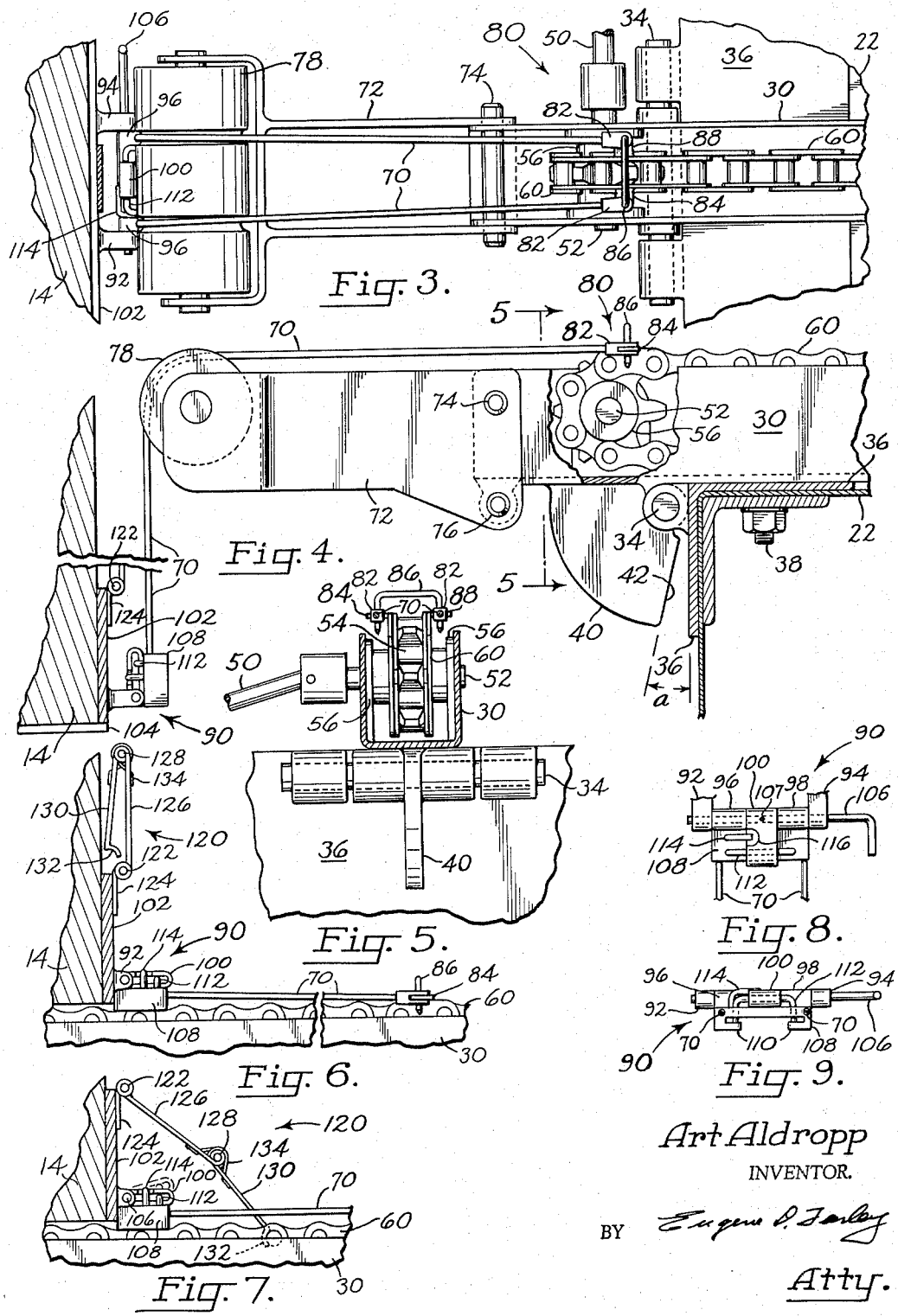

United States Patent Office 3,217,914
Patented Nov. 16, 1965

3,217,914
BOOM-TYPE CAMPER COACH LOADER
AND UNLOADER
Art Aldropp, Box 95, Langlois, Oreg.
Filed July 12, 1963, Ser. No. 294,525
7 Claims. (Cl. 214—516)

This invention pertains to apparatus and method for loading a body such as a coach body, pallet, container box, etc., on, and unloading it from, the bed of a truck. It pertains particularly to apparatus and method for loading a camper body on the bed of a pickup truck, and for unloading it therefrom.

The effective and agreeable use of the popular camper-pickup truck combination is somewhat minimized by the difficulty of loading and unloading the camper, a procedure which is carried out frequently during the normal use of the combination. The procedure conventionally requires the application of tall jacks by means of which the camper is lifted to the necessary elevation, after which the truck is backed under it. The jacks then are lowered to load the camper on the truck. This procedure is reversed when the camper is unloaded.

The primary difficulty inherent in the jack procedure is that, because of the substantial weight of the camper and the height to which it must be elevated by the jacks, there is real danger of the camper falling, particularly if the ground is uneven. Also, since the jacks must be worked together, it requires at least two people to handle them.

It is accordingly the general object of this invention to provide a loader and unloader by means of which campers and other types of coach bodies may be loaded on trucks, characterized by the following advantages:

(1) Widely applicable to a diversity of camper-truck styles and sizes.
(2) Installable in the truck without interfering with its normal use.
(3) Fast in its operation.
(4) Operable easily by a single operator.
(5) Free from the hazard of spilling the camper on the ground.
(6) Free from the necessity of driving the truck under the camper, the apparatus itself moving the camper and truck relative to each other as required for the loading and unloading operations.
(7) Free from danger of accident to the loading and unloading personnel.
(8) Easily manufactured and installed at low cost.

The manner in which the foregoing and other objects of this invention are accomplished will be apparent from the accompanying specification and claims considered together with the drawings, wherein:

FIG. 1 is a plan view of a pickup truck bed with a coach body mounted thereon, the front and back ends of the coach body being broken away to show the mounting mechanism;

FIG. 2 is a fragmentary view in side elevation of the truck bed-coach body combination of FIG. 1;

FIGS. 3, 4, and 5 are enlarged detail plan, side elevational, and front elevational views, respectively, of the coach loading mechanism;

FIGS. 6 and 7 are detail, side elevational views illustrating the coach unloading mechanism in its inoperative and operative positions, respectively;

FIGS. 8 and 9 are detail views in plan and front elevation, respectively, of novel coupling means employed in the loading mechanism;

FIGS. 10 and 11 are detail views in side and front elevation, respectively, of crank means employed for actuating the loading mechanism;

FIG. 12 is a detail view in elevation of a novel leg attachable to the rear of the coach and useful in loading it on, and unloading it from, the truck; and FIGS. 13, 14, 15, and 16 are schematic side elevational views illustrating the sequence of steps followed in loading a camper on a pickup truck, using the presently described apparatus and method.

In the practice of the present invention the camper or other coach body is placed adjacent and aligned with the bed of a pickup or other truck. In this position, the plane of the bottom of the coach body is below the plane of the truck bed.

Horizontally spaced points on the coach body and the truck bed, for example the front lower edge of the coach body and the forward end of the truck bed, then are connected through a flexible connector.

The flexible connector is guided over the rear edge of the truck bed and to the forward portion thereof. Accordingly, by pulling on the connector, the front end of the coach body is lifted selectively above the plane of the truck bed, simultaneously tilting the coach body.

By continuing to pull on the connector, the tilted coach body is advanced relative to the truck bed, substantially to its balance point. It then is leveled and, by continuing to pull on the connector, advanced to its use location.

During this sequence of operations, it is not necessary to drive the truck under the coach body. Since the rear end of the latter remains anchored on the ground during the first stage of the operation, the pulling operation serves to pull the truck under the body, thereby mounting it.

The coach body may be unloaded by reversing the foregoing sequence.

Considering the foregoing in greater detail and with particular reference to the drawings:

As shown in FIG. 13, the apparatus and method of the invention may be applied to loading a camper-type coach, indicated generally at 10, on a pickup type truck, indicated generally at 12.

The camper is provided with the usual dormitory extension, which overlies the cab, and with a lower front edge 14. It preferably is supported on a pair of front legs 16 and a pair of rear legs 18. These materially assist in the loading and unloading operations, as will appear later.

The pickup truck is provided with the usual box 20, the floor of which forms the bed 22 (FIG. 1), which supports the camper in its use position. A step 24 is located at the rear of the box.

The mechanism employed for loading the camper on the truck bed is shown particularly in FIGS. 1–5 inclusive. It provides apparatus for lifting the front end of the camper and for pulling it along the length of the truck bed.

To this end there is provided a tiltable boom, 30, which extends longitudinally of the truck bed, centrally thereof. The boom conveniently may comprise a length of channel iron, the rear portion of which is hinged through a pin-and-knuckle hinge 34 to an angle iron 36.

The latter extends transversely across the back corner of the truck bed and is maintained removably in position by bolts 38. Accordingly, the boom may be installed quickly and easily when it is desired to mount the camper on the truck. However, when the truck is to be used for other purposes, the boom may then be removed simply by releasing the bolts.

It is a feature of the invention that the boom tilts upwardly to an angle at which it is substantially in line with the coach as the latter is pulled onto the truck bed in the first stages of the loading operation. However, stop means are provided to limit the degree of tilting beyond that required for smooth loading.

As shown in FIGS. 4 and 5, the stop means comprise a stop plate 40 welded between the central knuckle of hinge assembly 34 and the bottom of the boom 30. The leading edge 42 of the plate is designed to bear against angle iron 36. It is cut away at an angle determining the elevation of the boom, for example, at an angle such that the angle *a* of FIG. 4 will be of the order of 20°.

The pulling means housed in boom 30 is driven by suitable drive means which, in the illustrated form of the invention, comprises a hand crank, not shown, but attachable to a crank shaft 44 (FIG. 11), which is journaled in a bracket 46 mounted on step 24 of the truck.

Crank shaft 44 is coupled through a chain and sprocket assembly 48 of appropriate mechanical advantage to a joined connecting rod 50, the outer end of which also is journaled in bracket 46.

The inner end of connecting rod 50 is coupled to the shaft 52 of a drive sprocket 54, FIGS. 3–5. Drive shaft 52 is journaled in bearings 56 and extends through aligned openings in the rear end of boom 30. A cooperating idler sprocket assembly 58, FIG. 2, is mounted similarly at the forward end of the boom.

An endless chain 60 is mounted between the two sprocket assemblies and serves the function of pulling the coach body onto the truck bed during loading, as well as that of pushing the coach body off the truck bed when unloading.

Endless chain 60 is connected to the lower front edge of the coach body through flexible connecting means which, in the illustrated form of the invention, comprises a double cable 70. Guide means are provided for guiding the cable, as are first coupling means for coupling it to the endless chain, and second coupling means for coupling it to the coach body.

As shown in FIGS. 3 and 4, the cable guide means employed comprises a pair of parallel plates 72 the inner ends of which overlap the sides of boom 30 and are fastened releasably thereto by means of pins 74, 76.

The rearward ends of plates 72 are spread to accommodate a doubly-grooved pulley 78, the shaft of which is journaled between the plate ends. The grooves of the pulley support, guide and space the strands of cable 70.

The first coupling, indicated generally at 80, is used to couple the leading end of cable 70 to drive chain 60. It comprises a pair of clevises 82 swaged one to the end of each of the cable strands. Each of the clevises engages one of a pair of oppositely arranged angled plates or tabs 84 welded, or otherwise fixed, to a selected one of the links of chain 60. A U-shaped pin 86 then may be inserted in the registering openings of clevises 82 and tabs 84, thereby releasably coupling together drive chain 60 and the leading end of cable 70.

The second cable coupling means is employed to couple the coach body to the trailing end of cable 70. It is indicated generally at 90, and illustrated in detail in FIGS. 8 and 9.

Coupling 90 serves two important functions.

First, it serves the function mentioned above of attaching the coach to the trailing end of cable 70. This function is illustrated in FIG. 4. Second, it serves the function of coupling the coach, after it has been partly mounted on the truck, directly to drive chain 60. This function is illustrated in FIG. 6. To accomplish these two functions the coupler must operate in both vertical and horizontal positions.

Accordingly, the coupler is mounted on a pin-and-knuckle hinge which, in the illustrated form of the invention, includes four knuckles, 92, 94, 96, 98, and an interposed, looped clevis pin actuator 100, the function of which will appear hereinafter.

Outer knuckles, 92, 94, extend horizontally from, and are fixed to, an angle iron base 102 which is secured to the lower, forward edge 14 of the coach body. The horizontal segment of the angle iron is cut away at 104, FIG. 4, to provide clearance for chain 60 as shown in FIG. 6.

Knuckles 92, 94, together with knuckles 96, 98 and clevis actuator 100, are held in assembled relation by means of a hinge pin 106 having a crank extension on its outer end. The hinge pin is fixed by means of set screw 107, or otherwise, to actuator 100 so that, by turning the pin, a corresponding angular motion is imparted to the actuator.

Knuckles 96, 98 mount a clevis block 108 which extends outwardly and is provided with integral, opposite clevis sections 110, FIG. 9. For purposes explained more fully hereinafter, these are dimensioned to receive angled plates or tabs 84 on drive chain 60, which may be releasably secured to the clevis sections by means of a U-shaped clevis pin 112. The legs of the pin are received in registering perforations through clevis sections 110 and chain tabs 84, and the central segment of the pin is received in actuator 100.

Thus, by turning hinge pin 106, clevis pin 112 may be lifted in and out of engagement with tabs 84 on the drive chain. To limit this motion, and prevent the entire withdrawal of the clevis pin from clevis block 108 in which it works, there is provided a stop 114 extending upwardly from the block and bent to engage looped actuator 100 at its position of maximum upward rotation. To provide the necessary clearance, the upper surface of actuator 100 is cut away at 116 so that the stop works against the undersurface of the actuator.

Means are provided on clevis block 108 for connecting the trailing end of cable 70 to it. This may be accomplished conveniently merely by providing spaced openings through the block and running the looped end of the cable through the openings, the free ends then being swaged to clevis 82 as described above.

In its loading function, drive chain 60 lifts the front end of the coach above the plane of the truck bed and then moves the coach and truck horizontally relative to each other as required to locate the coach on the truck bed. In its unloading function, drive chain 60 reverses its loading action and moves the coach and truck relative to each other in the direction of unloading the coach. It thus serves a pushing function to accomplish which the push rod assembly of FIGS. 6 and 7 is applied.

The latter assembly, indicated generally at 120, is secured to the vertical section of angle iron 102 on the lower front corner of the coach. For this purpose one end of the push rod assembly is provided with a friction type hinge 122, so constructed that the friction of the hinge components makes it possible to adjust it between the elevated, rest position of FIG. 6 and the depressed use position of FIG. 7.

One leaf, 124, of hinge 122 is welded or otherwise fixed to angle iron 102. The other leaf, 126, is elongated and joined, as indicated at 128.

The outer end 130 of the push rod assembly is provided with a contact member 132 dimensioned to engage one of the crosspins of chain 60. A spring 134 cooperates with joint 128 in maintaining it in the folded position of FIG. 6.

Thus, when it is desired to use the push rod assembly, it may be opened out to the use position of FIG. 7, in which segments 126, 130 are past dead center and accordingly remain in extended position. Contact element 132 then may be placed against a selected one of the crosspins of chain 60 so that, when the chain is reversed, or moved from right to left, as shown in FIG. 7, the entire assembly 120 serves as a push rod for moving the coach body from the truck bed.

The movement of the coach body on and off the bed is facilitated by guide means shown particularly in FIGS. 1 and 2. Such means comprises a pair of laterally spaced, parallel, longitudinally extending runners 140 the forward ends of which are cut away at 142 to guide the coach upwardly over the back corner of the truck bed.

The runners, in turn, work on spaced, flanged rollers 144 fastened to the truck bed and extending rearwardly therefrom, aligned with the runners. As the forward end of the coach is lifted up onto the rear corner of the truck bed, runners 140 engage flanged rollers 144 and guide the coach during its motion. Once the coach has assumed its horizontal position on the truck bed, it slides on the runners until its advanced, use position has been reached.

Forward legs 16, and rearward legs 18, of the coach body further assist in the loading and unloading operations. They are removable, and serve to support the coach body when it is demounted from the truck. In addition, however, rearward legs 18, serve the dual functions of providing bearing points by means of which the truck and coach body are moved relative to each other, and of acting as shock absorbers for absorbing the unloading shock when the coach is removed from the truck.

The construction of legs 18 is shown in detail in FIG. 12. Each is secured by means of bolts 146 to the back end of one of runners 140.

Each leg comprises a U-shaped stand 148, the upper end of which is formed with a socket 150 dimensioned to receive runner 140, and perforated to receive bolt 146 as explained above.

The central segment 152 of the stand has an opening in which is inserted a pair of telescoping cylinders 154, 156.

Cylinder 154 lies wholly within stand 148 and is welded to it. Cylinder 156 is slidably received within cylinder 154 and penetrates the opening in segment 152 of the stand. It is provided with a foot 158 at its lower extremity.

A compression spring 160 lies within the telescoping cylinders and reaches their full length, bearing against the cylinder end walls. A cable, chain or other flexible member 162 extends centrally of the cylinders and spring, being fastened to each of the end walls of the cylinders.

When the coach is resting on the ground, with its full weight on the legs, cylinder 156 will be retracted within cylinder 154, against the force of spring 160. However, when the coach is on the truck, ready to be unloaded, the force of spring 160 extends cylinder 156, which accordingly acts as a shock absorber during unloading.

*Operation*

The manner of operation of the presently described camper loader and unloader is as follows.

When the camper coach is to be loaded on the bed of a pickup truck, the coach and truck are arranged as shown in FIG. 13, aligned with each other, with the rear end of the truck adjacent the forward end of the coach. The truck is placed in neutral with the brake off.

Cable 70 then is placed across the grooves of guide roller 78 on the rear end of boom 30. Endless chain 60 is moved forwardly or backwardly by turning crank 44 until angle plates or tabs 84 on the chain may be inserted in clevises 82 on the cable. These elements then are releasably locked together by means of clevis pin 86. Chain 60 then is cranked forwardly.

This lifts the forward end of the coach to the tilted position of FIG. 14, while at the same time tilting boom 30 to an angle at which it is aligned with the coach, this angle being determined by the action of stop 40, FIG. 4.

In this manner, the front edge of the coach is lifted above the plane of the truck bed. Further advancement of chain 60 results in relative horizontal movement of the coach and truck, this usually being the result of the truck being pulled beneath the coach until the balance point of the coach has been reached, FIG. 15. The motion of the truck is made apparent by reference to reference points R of FIGS. 13–16.

When the coach body has reached the position of FIG. 15, it no longer can be pulled by cable 70, since coupler 80 thereof will have reached the forward extremity of the boom mounting the chain. However, coupler 90 now will have reached an operative position with respect to the chain.

Accordingly, coupler 80 is uncoupled from the chain, and coupler 90 coupled to it, by inserting angled plates 84 in clevis sections 110 of the latter coupler, and inserting U-shaped clevis pin 112 by appropriate manipulation of crank pin 106, FIGS. 8 and 9.

The coach then may be tilted to a horizontal position and advanced by further turning of crank 44 until it has reached its use location on the truck, as shown in FIG. 16.

Legs 16 are removed at the start of the operation as soon as the front of the coach has been lifted from the ground. Legs 18 may be removed at the completion of the loading operation, or, in the alternative, they may be left in place, tucked against step 24.

In unloading the coach from the truck, the foregoing sequence is reversed.

First legs 18 are put on the coach, if they have been removed. Next crank 44 is turned backwardly, moving the coach body to the position of FIG. 15, through the action of coupler 90. At this position coupler 90 is uncoupled and push rod assembly 120 engaged with a suitably located link of chain 60, FIGS. 6 and 7. Cable coupling 80 is also engaged. However, at first the cable does no work.

The reverse actuation of crank 44 is continued, and the coach tilted until legs 18 reach the ground. Any shock from this procedure is absorbed by telescoping, spring-pressed cylinders 154, 156, which are components of the rear leg assemblies.

With the rear legs bearing against the ground, further reverse operation of crank 44 will move the truck forwardly until the position of FIG. 14 is reached. As the coach body passes over the back of the truck, cable 70 again is used, this time as a restraining member to control the lowering of the coach. Front legs 16 then are placed on the front end of the coach, and the lowering continued until the rest position of FIG. 13 is reached. Cable 70 thereupon is uncoupled, thus completing the procedure.

Having thus described my invention in preferred embodiments what I claim as new and desire to protect by Letters Patent is:

1. Apparatus for loading a body on the aligned and adjacent bed of a truck, the plane of the bottom of the coach body being below the plane of the truck bed, the apparatus comprising:
    (a) pulling means adapted to be mounted on the truck bed for pivotal movement on an axis substantially parallel to and adjacent on edge of the truck bed and for longitudinal movement substantially normal to said axis,
    (b) flexible connecting means for interconnecting the pulling means and body,
    (c) first coupling means on one end of the flexible connecting means for coupling the same to the bottom of the body,
    (d) second coupling means on the other end of the flexible connecting means for coupling the same to the pulling means, and
    (e) guide means on the pulling means arranged for guiding the longitudinal movement of the flexible connecting means as it is pulled by the pulling means.

2. The apparatus of claim 1 wherein the pulling means comprises a boom adapted to be hinged to the rear of the truck bed and to extend forward over the truck bed, an endless chain mounted on the boom, and drive means connected to the endless chain.

3. The apparatus of claim 1 wherein the pulling means comprises endless chain means and drive means therefor, the chain having perforated tabs on a selected one of its links, and wherein the first coupling means comprises hinge pin and knuckle hinge means including at least two knuckles adapted to be fastened to the lower edge of the end of the body to be connected to the flexible connecting means, the hinge pin being rotatable in the knuckles and having a crank handle on one of its ends, the knuckles having mounted thereon a block fastened to the flexible connecting means, intermediate the knuckles a clevis pin actuator fixed to the hinge pin and rotatable therewith, a clevis pin in the actuator and operable thereby, and clevis means on the block dimensioned to receive the chain tabs and the clevis pin in releasably interlocking engagement.

4. The apparatus of claim 1 including push rod means adapted to be mounted on the connecting end of the body to be loaded and releasably engaging the pulling means when the pulling means is operated in a reverse direction for unloading the body from the truck bed.

5. The apparatus of claim 4 wherein the pushrod means comprises a pair of bars arranged end to end and interconnected by hinge means, coil spring means cooperating with the hinge means for maintaining the bars normally in folded position, friction hinge means at the outer end of one of the bars for hinging it to the body to be loaded, and engaging means on the outer end of the other bar for engaging the pulling means.

6. The apparatus of claim 1 including a pair of spring loaded legs adapted to be attached one to each of the rear corners of the body to be loaded, each leg comprising a pair of telescoping cylinders, compression spring means seated within the cylinders, foot means at the outer end of the cylinder pair, fastening means on the inner end of the cylinder pair for fastening it to the body, and stand means fixed to the upper one of the telescoping cylinders, the lower cylinder working through the bottom of the stand means and the foot means bearing against the same when the legs bears the full weight of the body.

7. Apparatus for loading a body on a truck bed comprising
  (a) an elongated boom,
  (b) pivot means intermediate the ends of the boom and adapted for mounting at an edge of a truck bed for pivoting the boom freely on a horizontal axis between an inclined position relative to the truck bed and a horizontal position in which a portion of the boom forward of the pivot means rests upon the truck bed and the portion of the boom rearward of the pivot means extends outwardly from the truck bed,
  (c) pulling means including reversible drive means therefor mounted on the boom for movement therewith,
  (d) the pulling means including flexible elongated connecting means movable longitudinally of the boom and extending beyond the rearward end of the boom for releasable connection to the adjacent end of the bottom of the body to be loaded, and
  (e) guide means on the rearward end of the boom for guiding the flexible connecting means during movement thereof,
  (f) the boom being arranged to pivot freely about the pivot means to the inclined plane of the bottom of the body, under the weight of the body, as the connected end of the latter is elevated from its normal plane below the truck bed during the preliminary stage of loading, and then to pivot freely to the horizontal position, under the weight of the body, as the latter is drawn onto the truck bed.

References Cited by the Examiner

UNITED STATES PATENTS

| | | | |
|---|---|---|---|
| 1,269,265 | 6/1918 | Duggan | 214—515 |
| 1,567,478 | 12/1925 | Vonnez et al. | 214—517 |
| 2,099,684 | 11/1937 | Fitch | 214—83.36 |
| 2,173,076 | 9/1939 | Stetson | 296—23 |
| 2,582,635 | 1/1952 | Kipple | 296—23 |
| 2,659,504 | 11/1953 | Kranawetvogel et al. | 214—85.36 |
| 2,748,965 | 6/1956 | Gray | 214—505 |
| 2,799,408 | 7/1957 | Overton | 214—85.5 |
| 2,958,432 | 11/1960 | Milhem | 214—84 |
| 3,034,674 | 5/1962 | Bertoglio et al. | 214—85.5 |
| 3,051,339 | 8/1962 | Terho | 214—505 |
| 3,064,836 | 11/1962 | Rupert. | |
| 3,077,278 | 2/1963 | Alexander | 214—85.5 |

FOREIGN PATENTS

| | | |
|---|---|---|
| 233,866 | 4/1960 | Australia. |
| 1,127,451 | 8/1956 | France. |
| 1,165,660 | 6/1958 | France. |
| 852,222 | 10/1952 | Germany. |
| 93,476 | 2/1960 | Netherlands. |

HUGO O. SCHULZ, *Primary Examiner.*

MORRIS TEMIN, *Examiner.*